(No Model.)
H. BLUMENBERG, Jr.
ELECTROLYSIS.
No. 519,400. Patented May 8, 1894.
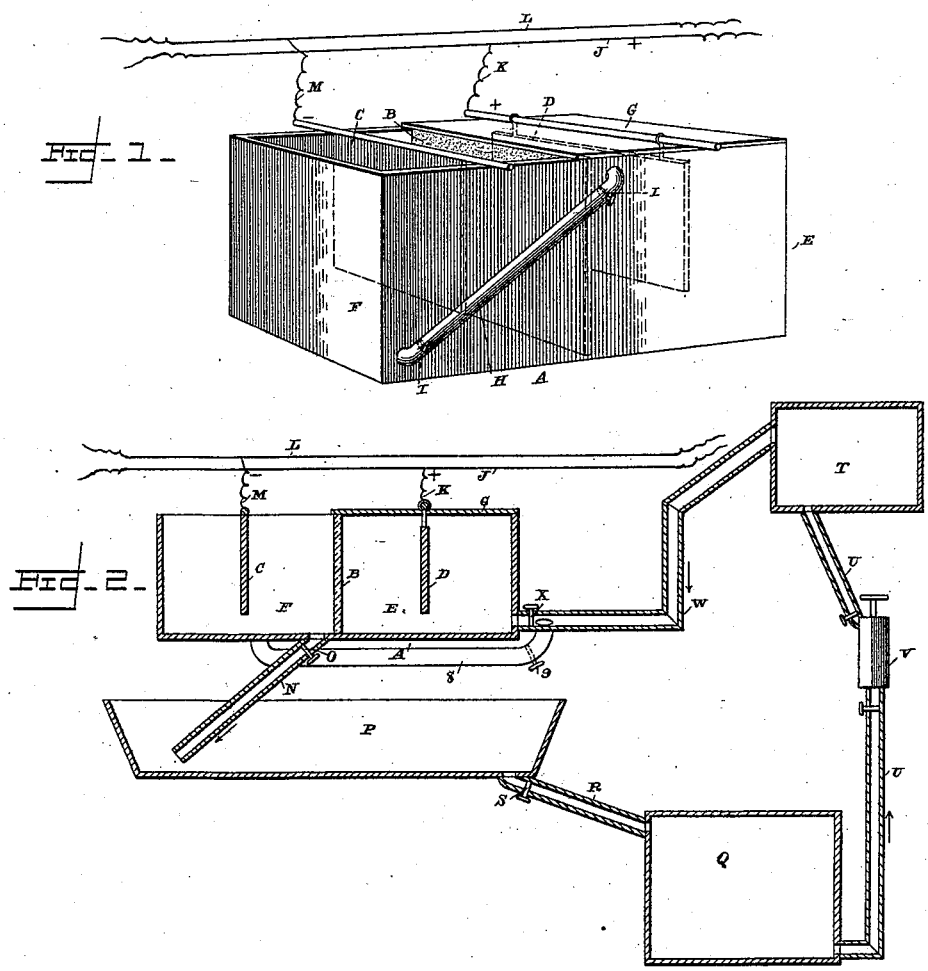
Witnesses
Edw S Duvall Jr.
Geo. L. Clark
Inventor
H. Blumenberg Jr.
by Fenelon B. Brock
Attorney
THE NATIONAL LITHOGRAPHING COMPANY,
WASHINGTON, D. C.

UNITED STATES PATENT OFFICE.

HENRY BLUMENBERG, JR., OF MOUNT VERNON, NEW YORK.

ELECTROLYSIS.

SPECIFICATION forming part of Letters Patent No. 519,400, dated May 8, 1894.

Application filed May 6, 1893. Serial No. 473,240. (No model.)

*To all whom it may concern:*

Be it known that I, HENRY BLUMENBERG, Jr., a citizen of the United States, residing at South Mount Vernon, in the county of Westchester, State of New York, have invented certain new and useful Improvements in Electrolyses; and I do declare the following to be a full, clear, and exact description of the invention, such as will enable others skilled in the art to which it appertains to make and use the same, reference being had to the letters and figures of reference marked on the accompanying drawings, which form a part of this specification.

The object of my invention is to obtain, by electrolytic action, bromates and chlorates from the alkaline metals and the metals of the alkaline earths from their respective bromides and chlorides.

Generally stated, in carrying my process into effect, I prepare an aqueous solution containing a bromide or chloride corresponding to the chlorate or bromate desired. For this purpose, a vat is used, such as shown in Figure 1 for example. This vat is usually divided into two compartments by a porous partition, or instead a porous vessel may be placed therein—in either case the vat being divided into two compartments. An electric battery with the opposite wires leading to electrodes placed in the compartments of the vat is provided, the circuit being closed through the aqueous solution therein. The bases are set free in the electro-negative compartment, and the halogen in the electro-positive division. If the nascent hydrogen reduces in the electro-negative compartment, the electrode therein may be agitated to prevent such action. That is to say any excess of hydrogen will have a tendency to polarize the negative electrode, which tendency is obviated by agitating that electrode. Otherwise that part of the electric current employed in electrolyzing would then be trying to overcome this state of polarization, and would show itself in an undue rise of the 120° temperature in the bath. Then again hydrogen must be gotten rid of to a certain extent to prevent its combining with the chlorine, and thereby forming hydrochloric acid, which would react upon the hydrate of potassium till they would be mutually neutralized, forming again the chloride of potassium.

In the exemplification of my invention I will place in the vat a potassic chloride. The electric current separates it into its respective halogen and base. The potassium in this case being the base, will be deposited in the electro-negative compartment, where it takes up one atom of oxygen from the electrolyte and also sets free one atom of hydrogen forming caustic potash.

Fig. 1 is a perspective view of an electrolytic bath to which I have applied my improvements. Fig. 2 is a diagrammatic view embodying my improved process.

Referring to the drawings—A represents the vat.

B is the porous partition dividing the vat into the usual positive and negative compartments.

C is the negative electrode, such as cobalt, platinum, iron, carbon, nickel, or other suitable material.

D is the positive electrode, preferably platinum.

E is the positive and F the negative compartment. The electro-positive division E is covered by a top G fitting air-tight thereon. The upper portion of compartment E contains halogen or acid radicals set free during electrolysis. Compartment F contains the electro-negative caustic solution or basic radicals.

H is a pipe leading from the upper part of the electro-positive division to the lower part of the electro-negative division, preferably outside the vat A, and provided with valve I at either end, for closing or opening the pipe.

J is the positive wire, having a branch K leading to electrode D, and L the negative wire having a branch M leading to the electrode C, from any suitable battery.

In Fig. 2 is shown a pipe N, having a valve O therein, leading from the electro-negative tank F, by means of which the tank F may be discharged into the vessel P below. Vessel P is designed to receive and hold the bromates and chlorates, in which they may be allowed to settle.

Q is a vat for holding the residue of the process.

R is a pipe, having a valve S therein, through which the vessel P may be tapped to draw off the material other than the bromates and chlorates.

T is a resaturator-tank having connection with the bottom of vat Q by a pipe U, in which is placed a pump V for forcing the residue with water up into said resaturator to utilize the product over again.

W is a pipe, having a valve X, leading from the resaturator near its top, back into the electro-positive compartment E.

The resaturator T contains material to make the product.

10 is a deflecting apron for the purpose of forcing the discharge into the bottom of the gas-holder before it is fed again to the vat A.

The following operation of my improvements will be described: An electrolyte having, in a solution of water, say potassic chloride, is put in the vat A. I then electrolyze the same. The halogen or acid radical chlorine goes to the electro-positive division, the potash to the electro-negative division decomposing the water there and forming caustic potash. The electro-positive division E, being air-tight, as soon as the chlorine is liberated it rises in the air above the electrolyte, goes through the pipe H, and decomposes the caustic solution in the electro-negative division F, forming chlorate and chloride of potash.

In Fig. 2 the product and by-product are gathered in vessel P. Here the product settles in the bottom of the vessel and the by-products are let through pipe R into the receiving vat Q. The pump V pumps the by-products through pipe U into the resaturator T, which contains potassic chloride, and resaturates the once-used electrolyte. Then, if valve X is opened in pipe W the by-products are carried to vat A and the process is carried over again.

8 is a pipe, having the valve 9, tapping the compartment F and the pipe W, by means of which the by-products may be led into both compartments E and F. The electric current needs only to have its voltage high enough to overcome the affinities of the halogen for the base.

The by-product varies according to the original substance put into the vat. If chloride of potassium be the material to produce the desired chlorate the by-product is then chloride of potassium, caustic potash water, chlorine gas, hydrochloric acid, a little chlorate of potash, and a percentage of the original impurities which the original chloride of potassium contained before putting the same into the vat. I prefer to have the bath at a temperature of 120° Fahrenheit in order that the hypochlorite formed will be resolved into chlorate and chloride of potassium.

I claim—

1. The combination of an electrolytic bath having positive and negative compartments, a pipe connecting the two, a settling tank connected with said bath, another tank, located between the settling tank and bath, and pipes connecting them into a continuous system.

2. The herein described process which consists in placing an electrolyte containing a haloid salt in a vat, electrolyzing the same thereby setting free the halogen at the positive electrode, and the base at the negative electrode, and finally transferring the liberated gas from the positive to the negative electrode, and thereby bring it into contact with the base.

3. The herein described process which consists in placing an electrolyte containing a haloid salt in a vat, then electrolyzing the same thereby setting free the halogen at the positive electrode and the base at the negative electrode, transferring the liberated gas from the positive to the negative electrode, then conveying the liquid electrolyte to a settling tank, and then leading the by products of the electrolyte to a resaturator and back to the vat.

In testimony whereof I affix my signature in presence of two witnesses.

HENRY BLUMENBERG, JR.

Witnesses:
GEO. J. PENFEILD,
WM. P. McCARTHY.